United States Patent [19]

Flippen, Jr. et al.

[11] 3,831,831

[45] Aug. 27, 1974

[54] DATA WEB GUIDING APPARATUS

[75] Inventors: George Burdine Flippen, Jr.; John Wesley Ward, Jr., both of Austin, Tex.

[73] Assignee: International Business Machines Corporation, Armonk, N.Y.

[22] Filed: May 29, 1973

[21] Appl. No.: 364,761

[52] U.S. Cl. .................................. 226/198, 242/76

[51] Int. Cl. .......................................... B65h 23/32

[58] Field of Search ........... 226/198, 189, 196, 190; 242/76, 157

[56] References Cited

UNITED STATES PATENTS

| | | | |
|---|---|---|---|
| 3,109,573 | 11/1963 | Sameshima | 242/76 X |
| 3,371,835 | 3/1968 | Pendleton | 226/198 X |
| 3,443,273 | 5/1969 | Arch | 226/198 X |
| 3,501,078 | 3/1970 | Chang | 226/198 |

*Primary Examiner*—Richard A. Schacher
*Attorney, Agent, or Firm*—Douglas H. Lefeve

[57] ABSTRACT

A data web guiding apparatus is disclosed which allows precision movement of a data web past a reading and writing transducer. A pair of rotatable cylinders are positioned in parallel spaced relation to each other for defining a plane over which the data web is passed. Fixedly mounted in spaced relation to a first end of each of these cylinders is a flange. At the other end of each of these cylinders is mounted a spring rail. The spring rails contact an edge of the data web and bias the web toward the fixed flanges as the web passes over the cylinders. When magnetic tape is used as the data web, precision movement of the tape past the guiding apparatus is achieved, in spite of variations in tape width due to temperature, humidity, or uneven cutting of the edges, with edge wear being held to a minimum under all such conditions.

5 Claims, 3 Drawing Figures

DATA WEB GUIDING APPARATUS

BACKGROUND OF THE INVENTION

1. Field of the Invention

This invention relates to the handling of data webs and more particularly to the precision guiding of data webs past a reading and writing transducer, wherein the web may have slight variations in width.

2. Description of the Prior Art

The term "data web" as used herein is meant to encompass a variety of media on which data may be recorded for reading therefrom. Examples of such media include elongated magnetic recording tapes, paper tapes, magnetic cards, and paper cards. Data may be written onto paper media by punching holes in the media and also by marking the media with ink. The following description of the background of this invention and of the invention itself will be described using magnetic tape as an example of a data web, although it will be understood by those skilled in the art that a variety of data webs of other forms may be accurately guided for reading and writing by apparatus utilizing the principles taught herein.

Various alignment methods have been considered in the prior art for guiding a magnetic tape past a reading and writing head. In any magnetic tape system it is of paramount importance that the magnetic tape be guided with utmost precision as it moves past a reading or writing station to ensure that information previously written upon the tape may be read from the tape without error or that information to be written upon the tape is written in such a manner that it may be later read without error.

One prior art method of tape guidance that has been considered utilizes at least two crowned rollers over which the tape is passed. Crowned rollers may be utilized to characteristically guide a moving web in a predetermined manner. A disadvantage of using crowned rollers lies in the fact that, although a web moving over crowned rollers will eventually seek the center of the rollers, a relatively low disturbing force will cause the web to temporarily move off-center.

Another method of magnetic tape guidance past a reading and writing transducer employs cylindrical rollers having flanges fixedly mounted to each end. The chief disadvantage of using this method is that the roller width and tape width must be manufactured to impractical tolerances. Further, external variations in temperature and humidity may cause a change in the width of the magnetic tape which does not match the corresponding roller width change. Thus, edge wear of the tape is accelerated during periods in which the tape width is wider than the distance between flanges and, conversely, unacceptable axial movement of the tape on the rollers would occur when the tape is substantially narrower than the width between the flanges.

Another problem which often occurs when it is attempted to guide a magnetic tape with precision relates to the fact that the edges of magnetic tape are often cut with a periodic wavelike pattern. The periods of the wavelike patterns of the edges are generally the same for both edges, although the wave amplitudes may be different and the patterns may be in or out of phase with each other. This occurs because relatively narrow magnetic tape is first manufactured in the form of a wide sheet which is later cut into a plurality of magnetic tapes of relatively narrow width by a plurality of disc-shaped cutters which roll on an axle. Any runout of these disc-shaped cutters causes variations in the width of the narrow magnetic tapes or may cause one or both of the edges of the tape to have a periodic wavelike pattern. A publication by J. D. Treder, et al., entitled "Precision Tape Guide," *IBM Technical Disclosure Bulletin*, Vol. 9, No. 10, page 1308, March 1967, describes this problem and discloses a solution therefor. The tape is passed over a curved surface to impart lateral stiffness to the tape. At opposite edges of this curved surface are guiding rails. One rail is fixed while the other rail is spring biased in the direction of the fixed rail to bias the tape toward the fixed rail. This publication teaches that the guiding rails and the curved surface must be of greater length than the pitch of the waviness in the tape edge. A disadvantage in using this approach, therefore, is one of compactness, since in many applications it is desirable to provide an entire tape handling system having a length substantially shorter than the period of waves in the edges of the tape. Another disadvantage of this approach is that the tracks on the tape must take the form of straight lines and the number of tracks which may be recorded on the tape is sometimes reduced, since the tracks can never extend beyond the narrowest width of the tape.

It would, therefore, be advantageous to provide a compact data web guiding apparatus which is relatively insensitive to external forces, temperature, and humidity, and which is relatively inexpensively manufactured.

SUMMARY OF THE INVENTION

The data web guiding apparatus of this invention comprises parallel, spaced apart cylindrical rollers defining a plane over which a data web may be passed. The data web is contoured around the rollers at each end of the plane to impart stiffness to the edges of the web as it enters and leaves the plane. At one end of each of the rollers a flange is fixedly mounted, while at the other end of each roller a spring biased rail is mounted. The rails contact an edge on one side of the web and bias the web against the fixed flanges at the opposite edge of the web.

The parallel rollers are spaced a substantially smaller distance apart than the period of the wavelike pattern defined by the edges of the web. A reading and/or writing transducer is positioned between the rollers in close proximity to the web in the planar portion thereof. When a magnetic tape is used for the data web multiple tracks of data may be written onto the magnetic tape in a wavelike pattern conforming to one edge of the tape, thereby allowing the possibility of greater total number of tracks than is obtainable when the tape is guided by prior art tape guiding devices.

Since the rollers are spaced at a substantially lesser distance than the period of the wavelike pattern, a more compact guiding apparatus is provided than has heretofore been achieved in the prior art. Further, relatively loose manufacturing tolerances may be adhered to in the manufacture of the components of this guiding apparatus, and, therefore, the guiding apparatus is relatively inexpensive. Also, edge wear of the magnetic tape is held to a minimum since the spring rails are easily movable by the tape to allow for expansion in the width of the tape.

The foregoing and other objects, features, and advantages of the invention will be apparent from the following more particular description of a preferred embodiment of the invention, as illustrated in the accompanying drawings.

DETAILED DESCRIPTION OF THE PREFERRED EMBODIMENT

Figure 1:
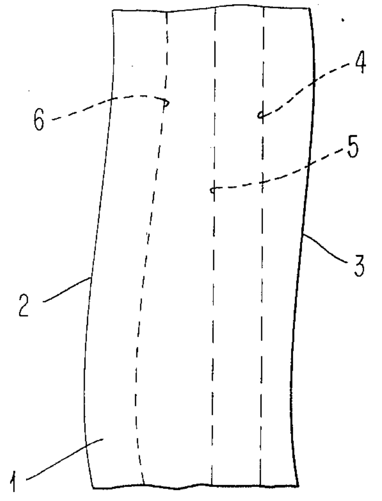
FIG. 1 is a plan view of a portion of magnetic tape showing a wavelike pattern in the edges of the tape and recording tracks produced by prior art tape guiding stations and by the data web guiding apparatus of this invention.

Referring now to FIG. 1, a data web is shown which, for the purposes of this description, will be referred to as magnetic tape 1. Edges 2 and 3 of tape 1 are shown to have a wavelike pattern, although this pattern is greatly exaggerated in FIG. 1. The wavelike pattern of edges 2 and 3 is commonly caused in a magnetic tape by runout in the disc-shaped cutters used in cutting a relatively wide strip of magnetic tape into a plurality of relatively narrow magnetic tapes. If a magnetic tape head were positioned along the guiding station disclosed in the above-mentioned prior art publication, data could be recorded on tape 1 along straight recording tracks 4 and 5. It will be observed in FIG. 1 that the right-most straight line recording track would necessarily lie to the left of the left-moft portion of edge 3 and that the left-most straight line recording track would necessarily lie to the right of the right-most portion of edge 2. Conversely, as will be observed from the description below, a track, such as recording track 6, conforming to the wavelike pattern of one of the edges of tape 1, may be recorded when utilizing the guiding station of this invention. It will readily be observed that when the wavelike patterns of edges 2 and 3 are substantially in phase, a greater number of tracks having the shape of recording track 6 can be recorded on tape 1 than tracks having the shape of recording tracks 4 and 5. Thus, this invention teaches away from the prior art by enabling a greater total number of tracks on the tape when the wavelike patterns of the tape edges are substantially in phase.

Figure 3:
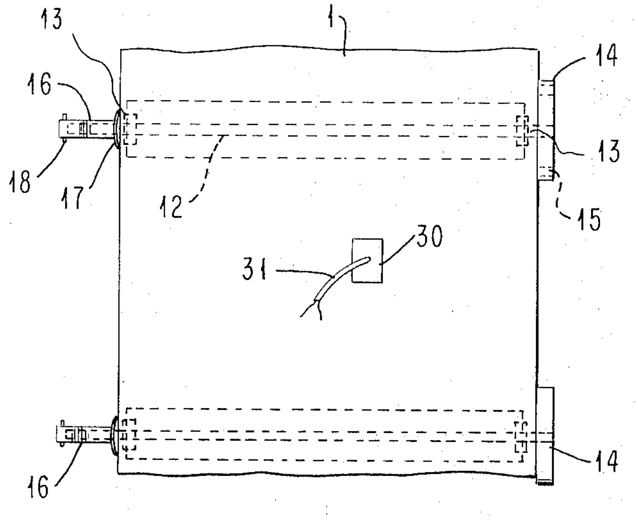
FIG. 3 is a plan view of the data web guiding apparatus of this invention.
Figure 2:
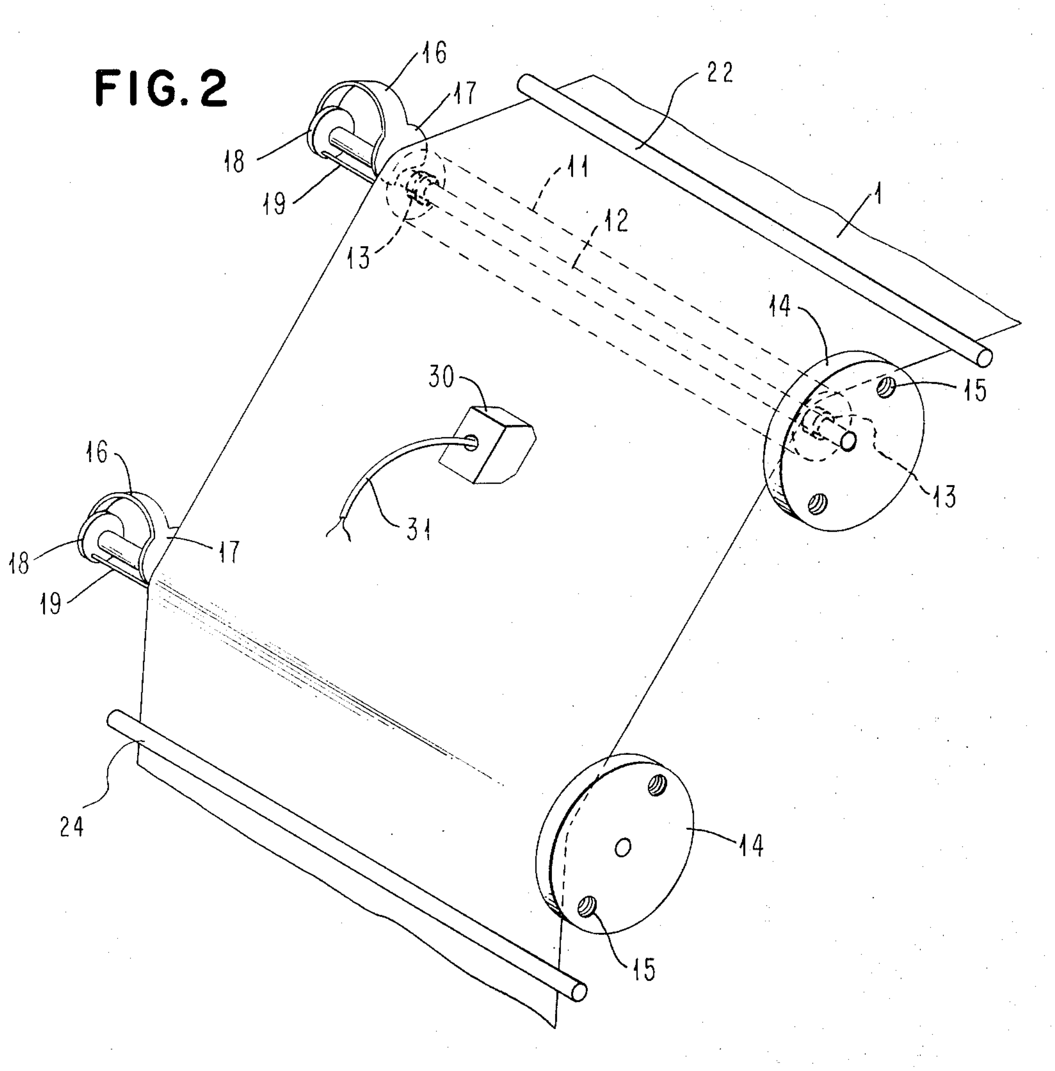
FIG. 2 is a perspective view of the data web guiding apparatus of this invention.

Referring now to FIGS. 2 and 3, the guiding apparatus of this invention is shown, wherein cylindrical rollers 11 are positioned in parallel spaced relation to each other, thereby defining a plane. Rollers 11 are rotatable about axles 12 by utilization of bearings 13. Flanges 14 are fixedly mounted to an external frame (not shown) by utilization of screws (not shown) which pass thorugh the external frame and thread into tapped holes 15. If axles 12 are of sufficient rigidity, they may be fixedly attached to flanges 14. Bearings 13 extend slightly beyond the ends of rollers 11 so that a small space exists between the ends of rollers 11 and flanges 14. Thus, bearings 13, rather than rollers 11 may, by axial movement of rollers 11, contact flanges 14.

At the ends of axles 12 opposite fixed flanges 14 are fixedly mounted collars 18. Attached to collars 18 are one end of bow-shaped springs 16. Attached to the other ends of springs 16 are rails 17, which are axially biased toward fixed flanges 14 by springs 16.

Pins 19 have one end fixedly attached to collars 18. The opposite end of pins 19 serve as a stop to inhibit more than a predetermined amount of axial movement of rollers 11 on shaft 12 by contacting the outer ends of bearings 13. Normally, a slight amount of axial movement of rollers 11 is allowed on shafts 12 to prevent constant friction between bearings 13 (in the ends of rollers 11) and pins 19 on one end of rollers 11 and between the ends of bearings 13 and flanges 14 on the other end of rollers 11. Pins 19, however, prevent more than a small amount of axial movement by rollers 11.

Magnetic tape head 30 having connecting cable 31 is shown in close proximity to tape 1 as tape 1 passes between rollers 11. It is noted that, although rollers 11 may move slightly in an axial direction, magnetic tape 1 does not move axially with respect to head 30.

A plane is defined by parallel rollers 11 allowing tape 1 to contact both of rollers 11 across its entire width without any twisting of tape 1. It is necessary that tape 1 enter this plane and depart from this plane at some angle to the plane, although the angles of entry and departure may be different. This entry and departure at an angle is necessary to provide strengthening of the tape edges at the roller positions. Guide rollers 22 and 24 are provided for guiding tape 1 onto and off of this plane at these angles.

The spacing of rollers 11 is substantially less than the period of the wavelike pattern of the edges of tape 1. Consequently, since tape 1 has an edge biased against flanges 14, tape 1 passes magnetic head 30 with a wavelike pattern that conforms to the edge of tape 1 which contacts flanges 14. This results in a recording track such as track 6 in FIG. 1. This allows a potentially larger number of tracks to be recorded on tape 1, since the tracks can extend very close to the edges of tape 1. A larger number of tracks can be recorded on a tape having substantially in-phase edges by using this apparatus, than if the same tape were guided by the prior art guiding apparatus described above. Further, because of the relatively close spacing of rollers 11, this invention teaches away from the prior art in that the guiding apparatus of this inventin is substantially more compact than those taught by the prior art.

In summary, a compact data web guiding apparatus has been disclosed. The guiding apparatus is relatively inexpensive, since none of the components thereof require extremely close tolerances. Further, edge wear of the data web is relatively uniform and minimal, since the edge strength of the tape is increased by wrapping it around rollers where it is guided. Variations in component dimensions of the guiding apparatus or tape dimensions due to extreme temperatures, humidity, or the like, do not inhibit the ability of the data web guiding apparatus to guide the data web with uniform precision.

While the invention has been particularly shown and described with reference to a preferred embodiment thereof, it will be understood by those skilled in the art that the foregoing and other changes in form and details may be made therein without departing from the spirit and scope of the invention. Further, although it is necessary that the rollers have a substantially cylindrical shape, if a web having a substantially low coefficient of friction were being guided, such that there was relatively low friction between the web and the rollers, the rollers could be fixed cylinders.

What is claimed is:

1. An apparatus for guiding a moveable elongated web comprising:

first and second cylinders rotatable about first and second axles, respectively, said cylinders being positioned in parallel, spaced relation to each other for defining a plane;

means fixedly mounted in spaced relation to one end of said first and second cylinders for contacting an edge of said web;

means axially moveable in relation to another end of said first and second cylinders and biased toward said fixedly mounted means, said axially moveable means having a substantially flat portion and a resilient bow-shaped portion, said substantially flat portion contacting an opposite edge of said web; and means for causing said web to enter and depart said plane at one or more angles to said plane so that the edges of said web are strengthened while in contact with said fixedly mounted means and said axially moveable means.

2. The guiding apparatus of claim 1 further comprising means to inhibit lateral movement of said rotatable cylinders on said axles beyond predetermined limits.

3. The guiding apparatus of claim 2 wherein said elongated web further comprises magnetic recording tape.

4. An apparatus for guiding a moveable elongated web wherein at least one of the edges of said web define a substantially periodic pattern, comprising:

first and second cylinders rotatable about first and second axles, respectively, said cylinders being positioned in parallel, spaced relation to each other for defining a plane;

means fixedly mounted in spaced relation to one end of said first and second cylinders for contacting an edge of said web;

means axially moveable in relation to another end of said first and second cylinders and biased toward said fixedly mounted means, said axially moveable means having a substantially flat portion and a resilient bow-shaped portion, said substantially flat portion contacting an opposite edge of said web; and means for causing said web to enter and depart said plane at one or more angles to said plane so that the edges of said web are strengthened while in contact with said fixedly mounted means and said axially moveable means.

5. The guiding apparatus of claim 4 wherein said parallel means further comprises two rollers spaced at a distance substantially less than the period of said wavelike pattern of said edge of said web.

* * * * *